US010466451B2

United States Patent
Tsai et al.

(10) Patent No.: US 10,466,451 B2
(45) Date of Patent: Nov. 5, 2019

(54) TWO-PIECE INFRARED SINGLE WAVELENGTH PROJECTION LENS SYSTEM

(71) Applicant: NEWMAX TECHNOLOGY CO., LTD., Tai-Chung (TW)

(72) Inventors: Fei-Hsin Tsai, Tai-Chung (TW); Ching-Yun Huang, Tai-Chung (TW)

(73) Assignee: NEWMAX TECHNOLOGY CO., LTD., Tai-Chung (TW)

( * ) Notice: Subject to any disclaimer, the term of this patent is extended or adjusted under 35 U.S.C. 154(b) by 96 days.

(21) Appl. No.: 15/830,003

(22) Filed: Dec. 4, 2017

(65) Prior Publication Data

US 2019/0170986 A1 Jun. 6, 2019

(51) Int. Cl.
*G02B 13/14* (2006.01)
*G02B 9/06* (2006.01)
*G02B 9/08* (2006.01)

(52) U.S. Cl.
CPC ............. *G02B 13/14* (2013.01); *G02B 9/06* (2013.01); *G02B 9/08* (2013.01)

(58) Field of Classification Search
CPC .......... G02B 13/14; G02B 13/18; G02B 9/00; G02B 9/06; G02B 9/08
USPC ........................................................ 359/356
See application file for complete search history.

(56) References Cited

U.S. PATENT DOCUMENTS

| 5,692,819 | A | * | 12/1997 | Mitsutake | ............... | F21V 5/048 |
| | | | | | | 348/E5.137 |
| 6,034,819 | A | * | 3/2000 | Ogata | .................. | G02B 5/1876 |
| | | | | | | 359/558 |
| 10,175,493 | B1 | * | 1/2019 | Chen | .................. | G02B 27/0955 |
| 2004/0141240 | A1 | * | 7/2004 | Do | ........................... | G02B 3/04 |
| | | | | | | 359/719 |
| 2007/0229982 | A1 | * | 10/2007 | Minakawa | ............... | G02B 9/08 |
| | | | | | | 359/740 |
| 2008/0106809 | A1 | * | 5/2008 | Hirano | ..................... | G02B 9/58 |
| | | | | | | 359/784 |
| 2010/0315726 | A1 | * | 12/2010 | Wang | .................... | G02B 13/06 |
| | | | | | | 359/767 |
| 2013/0182316 | A1 | * | 7/2013 | Fuse | ..................... | G02B 13/14 |
| | | | | | | 359/356 |
| 2013/0215498 | A1 | * | 8/2013 | Qui | ......................... | G02B 9/08 |
| | | | | | | 359/355 |

(Continued)

*Primary Examiner* — William R Alexander
(74) *Attorney, Agent, or Firm* — Bruce Stone LLP; Joseph Bruce

(57) ABSTRACT

A two-piece infrared single wavelength projection lens system includes, in order from an image side to an image source side: a first lens element with a positive refractive power having an image-side surface being convex near an optical axis and an image source-side surface being concave near the optical axis, at least one of the image-side and the image source-side surfaces of the first lens element being aspheric; a second lens element with a positive refractive power having an image-side surface being concave near the optical axis and an image source-side surface being convex near the optical axis, at least one of the image-side and the image source-side surfaces of the second lens element being aspheric; and a stop disposed before the image source-side surface of the first lens element or between the image source-side surface of the first lens element and an image-side surface of the second lens element.

15 Claims, 12 Drawing Sheets

(56) References Cited

U.S. PATENT DOCUMENTS

| | | | | |
|---|---|---|---|---|
| 2013/0293970 A1* | 11/2013 | Qiu | ................ | G02B 13/18 |
| | | | | 359/717 |
| 2015/0362708 A1* | 12/2015 | Lee | ................ | G02B 13/04 |
| | | | | 359/708 |
| 2015/0362709 A1* | 12/2015 | Wang | ................ | G02B 13/16 |
| | | | | 359/649 |
| 2016/0231539 A1* | 8/2016 | Huang | ................ | G02B 13/0065 |
| 2016/0266358 A1* | 9/2016 | Huang | ................ | G02B 13/14 |
| 2017/0038565 A1* | 2/2017 | Lin | ................ | G02B 13/16 |
| 2017/0052354 A1* | 2/2017 | Kim | ................ | G02B 17/08 |
| 2019/0011680 A1* | 1/2019 | Tsai | ................ | G02B 13/14 |
| 2019/0154976 A1* | 5/2019 | Tsai | ................ | G02B 13/008 |
| 2019/0154977 A1* | 5/2019 | Tsai | ................ | G02B 13/0035 |

\* cited by examiner

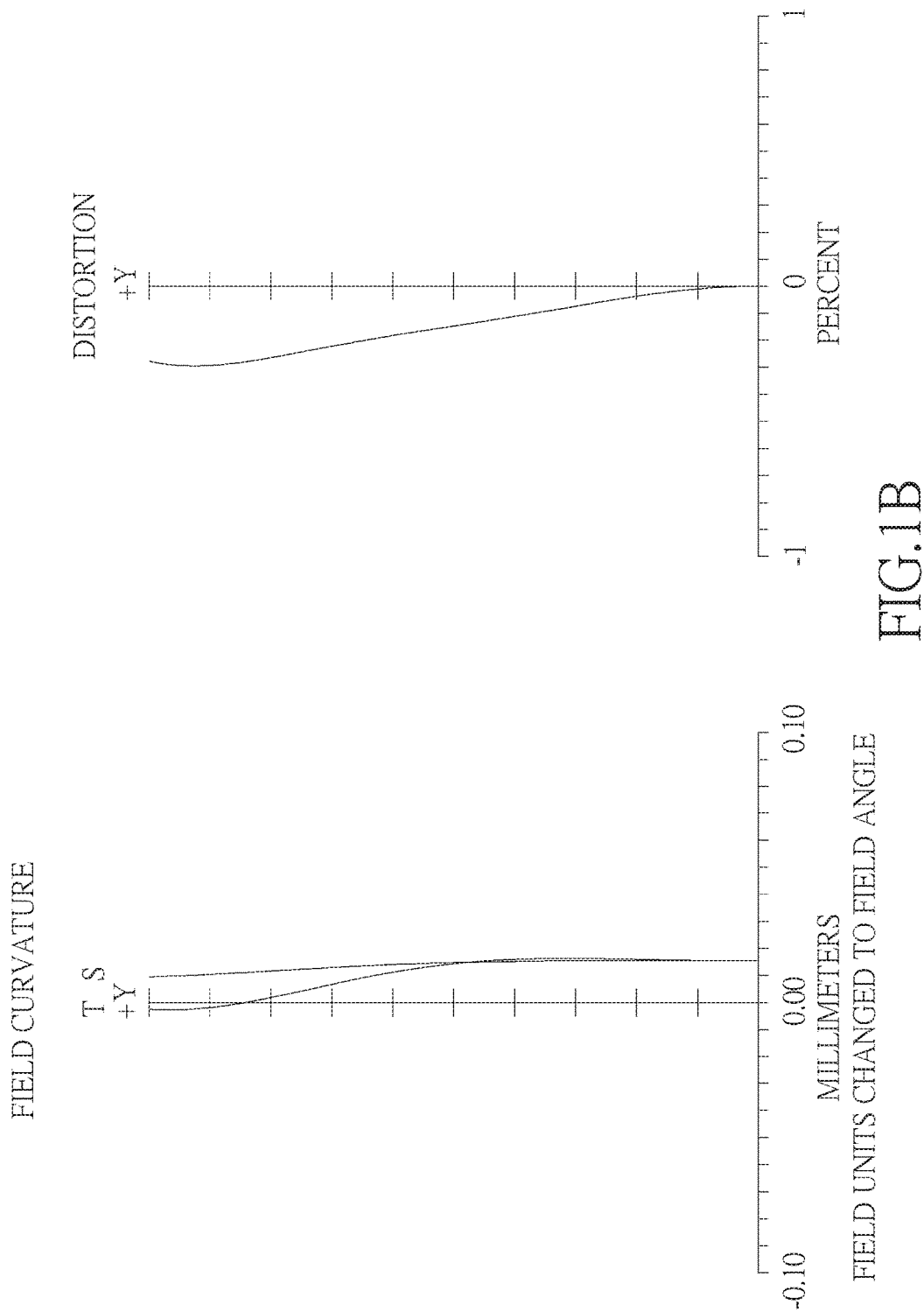

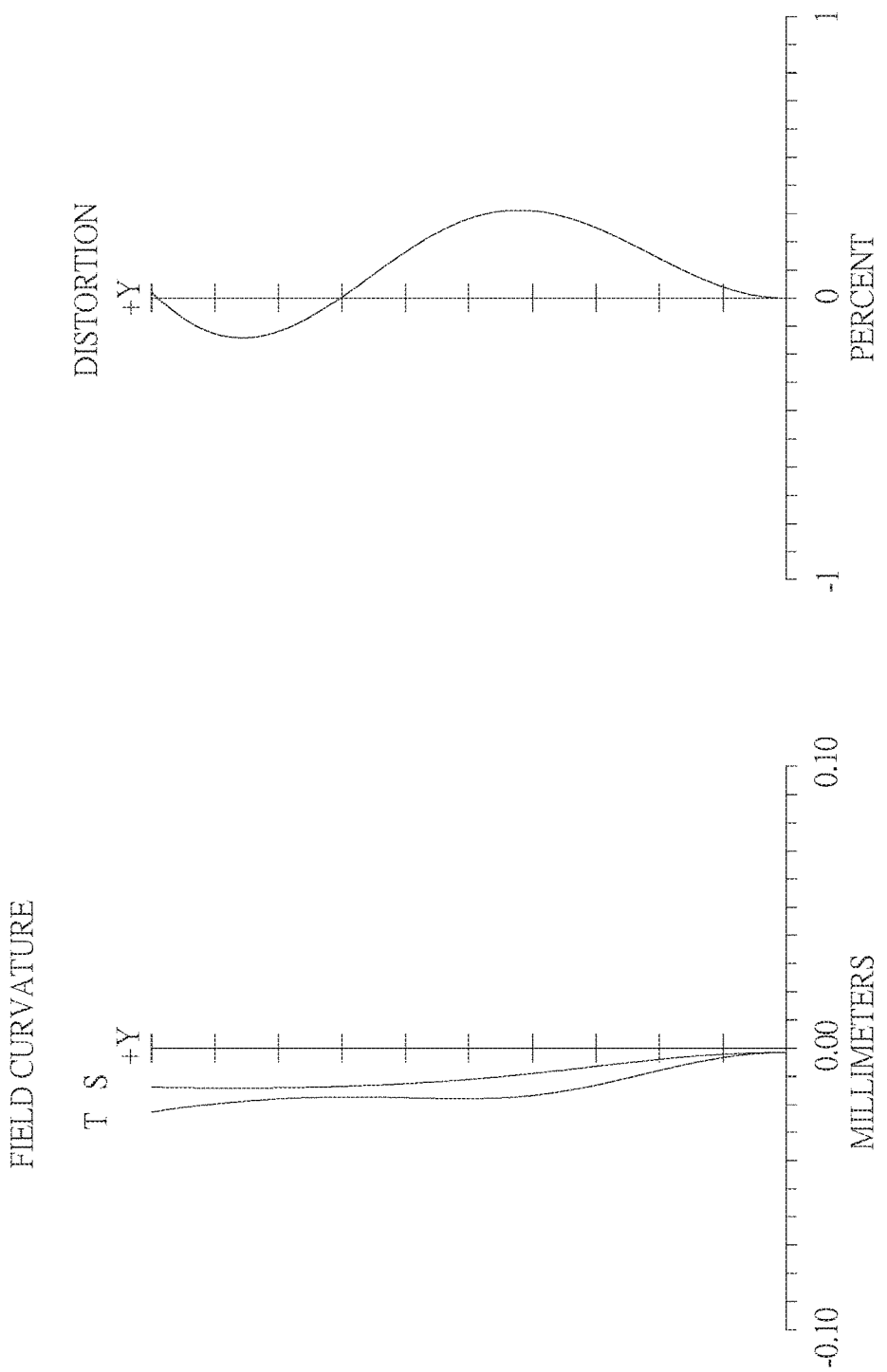

TWO-PIECE INFRARED SINGLE WAVELENGTH PROJECTION LENS SYSTEM

BACKGROUND OF THE INVENTION

Field of the Invention

The present invention relates to a projection lens system, and more particularly to a miniaturized two-piece infrared single wavelength projection lens system applicable to electronic products.

Description of the Prior Art

Nowadays digital imaging technology is constantly innovating and changing, in particular, digital carriers, such as, digital camera and mobile phone and so on, have become smaller in size, so CCD (Charge Coupled Device) or CMOS (Complementary Metal Oxide Semiconductor) sensor is also required to be more compact. In addition to be used in the field of photography, in recent years, infrared focusing lens has also be used in infrared receiving and sensing field of the game machine, and in order to make the scope of game machine induction user more broader, wide-angle lens group has become the mainstream for receiving infrared wavelength at present.

The applicant has also put forward a number of lens groups related to infrared wavelength reception, however, at present, the game machine is based on a more three-dimensional, real and immediate 3D game, the current or the applicant's previous lens groups are all 2D plane games, which cannot meet the 3D game focusing on the deep induction efficacy.

Special infrared receiving and induction lens groups for game machines are made of plastic for the pursuit of low cost, however, poor material transparency is one of the key factors that affect the depth detection accuracy of the game machine, and plastic lenses are easy to overheat or too cold in ambient temperature, so that the focal length of the lens group will be changed and cannot focus accurately. Therefore, the current infrared receiving and induction lens groups cannot meet the 3D game depth precise induction requirement.

The present invention mitigates and/or obviates the aforementioned disadvantages.

SUMMARY OF THE INVENTION

The primary objective of the present invention is to provide a two-piece infrared single wavelength projection lens system with better image sensing function.

Therefore, a two-piece infrared single wavelength projection lens system in accordance with the present invention comprises, in order from an image side to an image source side: a first lens element with a positive refractive power having an image-side surface being convex near an optical axis and an image source-side surface being concave near the optical axis, at least one of the image-side surface and the image source-side surface of the first lens element being aspheric; a second lens element with a positive refractive power having an image-side surface being concave near the optical axis and an image source-side surface being convex near the optical axis, at least one of the image-side surface and the image source-side surface of the second lens element being aspheric; a stop disposed before the image source-side surface of the first lens element or between the image source-side surface of the first lens element and the image-side surface of the second lens element.

Preferably, a focal length of the first lens element is f1, a focal length of the second lens element is f2, and they satisfy the relation: $0.7<f1/f2<1.4$, so that the refractive power of the first lens element and the second lens element are more suitable, it will be favorable to avoid the excessive increase of aberration of the system.

Preferably, a focal length of the two-piece infrared single wavelength projection lens system is f, the focal length of the first lens element is f1, and they satisfy the relation: $1.0<f/f1<1.7$, which can effectively control the refractive strength of the first lens element, so as to avoid poor light convergence effect caused by too weak refractive power or too large spherical aberration caused by too strong refractive power.

Preferably, the focal length of the two-piece infrared single wavelength projection lens system is f, the focal length of the second lens element is f2, and they satisfy the relation: $0.9<f/f2<1.7$, so that it will be favorable to reduce the sensitivity of the system.

Preferably, the focal length of the first lens element is f1, a radius of curvature of the image-side surface of the first lens element is R1, and they satisfy the relation: $2.2<f1/R1<3.0$, which can reduce the distortion.

Preferably, the focal length of the first lens element is f1, a radius of curvature of the image source-side surface of the first lens element is R2, and they satisfy the relation: $0.85<f1/R2<2.35$, so that the curvature of the image source-side surface of the first lens element will be appropriate, it will be favorable to reduce the total length of the two-piece infrared single wavelength projection lens system.

Preferably, the focal length of the second lens element is f2, a radius of curvature of the image-side surface of the second lens element is R3, and they satisfy the relation: $-4.7<f2/R3<-2.5$, it will be favorable to reduce the sensitivity of the two-piece infrared single wavelength projection lens system, effectively improving the yield of production.

Preferably, the focal length of the second lens element is f2, a radius of curvature of the image source-side surface of the second lens element is R4, and they satisfy the relation: $-3.9<f2/R4<-2.6$, it will be favorable to correct the aberration and reduce the sensitivity of the two-piece infrared single wavelength projection lens system, improving the image quality.

Preferably, the radius of curvature of the image-side surface of the first lens element is R1, the radius of curvature of the image source-side surface of the first lens element is R2, and they satisfy the relation: $0.25<R1/R2<0.95$, it will be favorable to correct the spherical aberration of the system.

Preferably, the radius of curvature of the image-side surface of the second lens element is R3, the radius of curvature of the image source-side surface of the second lens element is R4, and they satisfy the relation: $0.6<R3/R4<1.3$, which can avoid excessive curvature of the image source-side surface of the second lens element, resulting in high sensitivity and decline in yield.

Preferably, the radius of curvature of the image source-side surface of the first lens element is R2, the radius of curvature of the image source-side surface of the second lens element is R4, and they satisfy the relation: $-0.81<R2/R4<-0.13$, so as to correct the aberration of the system.

Preferably, the radius of curvature of the image source-side surface of the first lens element is R2, the radius of curvature of the image-side surface of the second lens element is R3, and they satisfy the relation: −3.4<R2/R3<−1.2, so as to correct the aberration of the system.

Preferably, the radius of curvature of the image-side surface of the first lens element is R1, the radius of curvature of the image source-side surface of the second lens element is R4, and they satisfy the relation: −1.7<R1/R4<−0.8, so as to correct the aberration of the system.

Preferably, a central thickness of the first lens element along the optical axis is CT1, a central thickness of the second lens element along the optical axis is CT2, and they satisfy the relation: 0.2<CT1/CT2<1.3, which makes the lens contact with the external environment more robust and easy to maintain, so as to improve the production rate.

Preferably, the focal length of the two-piece infrared single wavelength projection lens system is f, a distance from the image-side surface of the first lens element to the image plane along the optical axis is TL, and they satisfy the relation: 0.7<f/TL<1.2, it will be favorable to maintain the objective of miniaturization of the two-piece infrared single wavelength projection lens system, which can be used in thin electronic products.

Preferably, a refractive index of the first lens element is n1, a refractive index of the second lens element is n2, and they satisfy the relations: n1>1.6 and n2>1.6, it will be favorable to match and reconcile the lens elements of the two-piece infrared single wavelength projection lens system, so as to provide better aberration balance ability.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 1B shows the astigmatic field curve and the distortion curve of the first embodiment of the present invention;

FIG. 6B shows the astigmatic field curve and the distortion curve of the sixth embodiment of the present invention.

DETAILED DESCRIPTION OF THE PREFERRED EMBODIMENTS

Figure 1A:
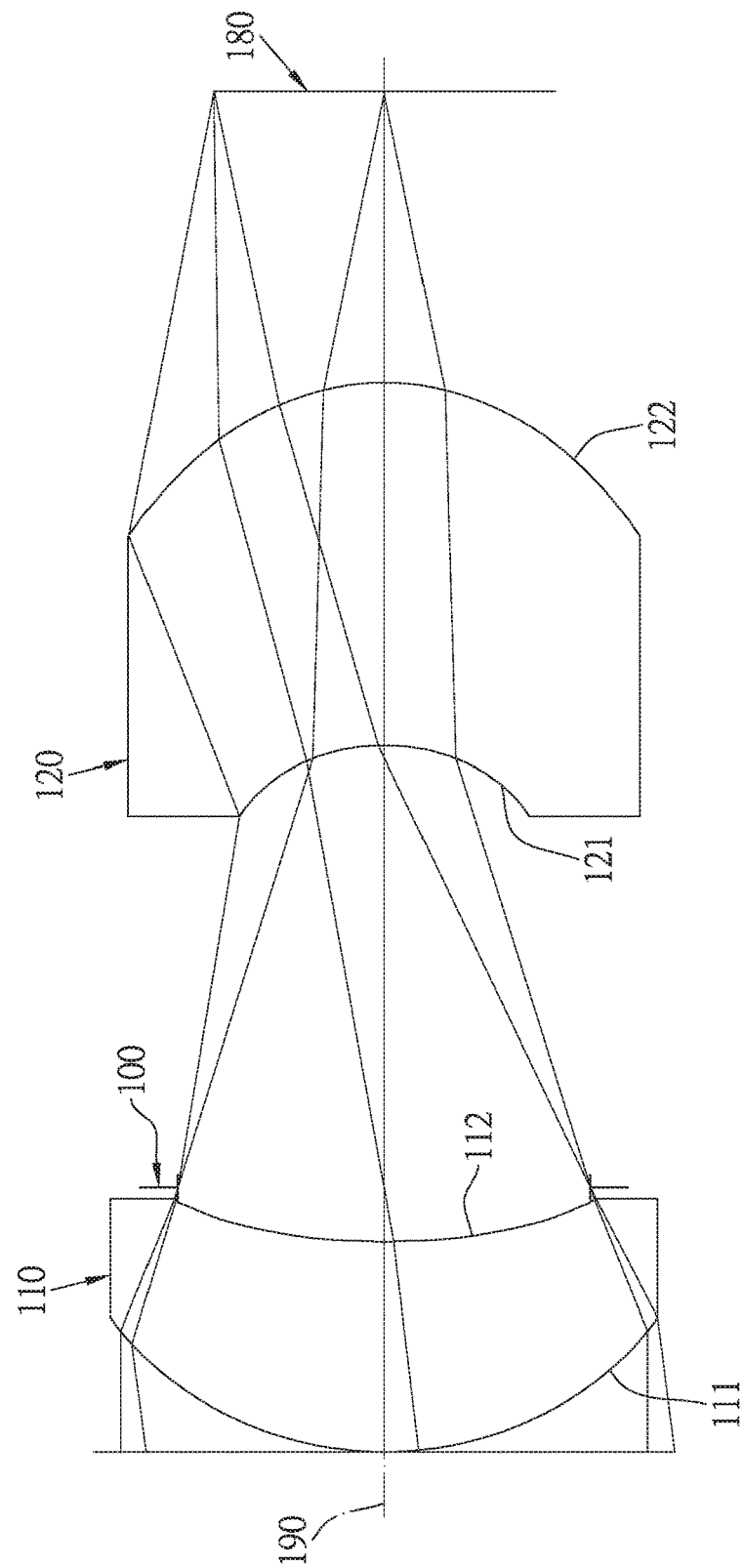
FIG. 1A shows a two-piece infrared single wavelength projection lens system in accordance with a first embodiment of the present invention.

Referring to FIGS. 1A and 1B, FIG. 1A shows a two-piece infrared single wavelength projection lens system in accordance with a first embodiment of the present invention, and FIG. 1B shows, in order from left to right, the astigmatic field curve and the distortion curve of the first embodiment of the present invention. A two-piece infrared single wavelength projection lens system in accordance with the first embodiment of the present invention comprises a stop 100 and a lens group. The lens group comprises, in order from an object side to an image side: a first lens element 110, a second lens element 120, and an image source plane 180, wherein the two-piece infrared single wavelength projection lens system has a total of two lens elements with refractive power. The stop 100 is disposed between an image source-side surface 112 of the first lens element 110 and an image-side surface 121 of the second lens element 120.

The first lens element 110 with a positive refractive power has an image-side surface 111 being convex near an optical axis 190 and the image source-side surface 112 being concave near the optical axis 190, the image-side surface 111 and the image source-side surface 112 are aspheric, and the first lens element 110 is made of plastic material.

The second lens element 120 with a positive refractive power has the image-side surface 121 being concave near the optical axis 190 and an image source-side surface 122 being convex near the optical axis 190, the image-side surface 121 and the image source-side surface 122 are aspheric, and the second lens element 120 is made of plastic material.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots\ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present two-piece infrared single wavelength projection lens system, a focal length of the two-piece infrared single wavelength projection lens system is f, a f-number of the two-piece infrared single wavelength projection lens system is Fno, the two-piece infrared single wavelength projection lens system has a maximum view angle (field of view) FOV, and they satisfy the relations: f=3.40 mm; Fno=2.5; and FOV=14.8 degrees.

In the first embodiment of the present two-piece infrared single wavelength projection lens system, a focal length of the first lens element 110 is f1, a focal length of the second lens element 120 is f2, and they satisfy the relation: f1/f2=1.072.

In the first embodiment of the present two-piece infrared single wavelength projection lens system, the focal length of the two-piece infrared single wavelength projection lens system is f, the focal length of the first lens element 110 is f1, and they satisfy the relation: f/f1=1.336.

In the first embodiment of the present two-piece infrared single wavelength projection lens system, the focal length of the two-piece infrared single wavelength projection lens system is f, the focal length of the second lens element 120 is f2, and they satisfy the relation: f/f2=1.432.

In the first embodiment of the present two-piece infrared single wavelength projection lens system, the focal length of the first lens element 110 is f1, a radius of curvature of the image-side surface 111 of the first lens element 110 is R1, and they satisfy the relation: f1/R1=2.785.

In the first embodiment of the present two-piece infrared single wavelength projection lens system, the focal length of the first lens element 110 is f1, a radius of curvature of the image source-side surface 112 of the first lens element 110 is R2, and they satisfy the relation: f1/R2=1.482.

In the first embodiment of the present two-piece infrared single wavelength projection lens system, the focal length of the second lens element 120 is f2, a radius of curvature of the image-side surface 121 of the second lens element 120 is R3, and they satisfy the relation: f2/R3=−4.344.

In the first embodiment of the present two-piece infrared single wavelength projection lens system, the focal length of the second lens element 120 is f2, a radius of curvature of the image source-side surface 122 of the second lens element 120 is R4, and they satisfy the relation: f2/R4=−3.624.

In the first embodiment of the present two-piece infrared single wavelength projection lens system, the radius of curvature of the image-side surface 111 of the first lens element 110 is R1, the radius of curvature of the image source-side surface 112 of the first lens element 110 is R2, and they satisfy the relation: R1/R2=0.532.

In the first embodiment of the present two-piece infrared single wavelength projection lens system, the radius of curvature of the image-side surface 121 of the second lens element 120 is R3, the radius of curvature of the image source-side surface 122 of the second lens element 120 is R4, and they satisfy the relation: R3/R4=0.834.

In the first embodiment of the present two-piece infrared single wavelength projection lens system, the radius of curvature of the image source-side surface 112 of the first lens element 110 is R2, the radius of curvature of the image source-side surface 122 of the second lens element 120 is R4, and they satisfy the relation: R2/R4=−0.382.

In the first embodiment of the present two-piece infrared single wavelength projection lens system, the radius of curvature of the image source-side surface 112 of the first lens element 110 is R2, the radius of curvature of the image-side surface 121 of the second lens element 120 is R3, and they satisfy the relation: R2/R3=−3.141.

In the first embodiment of the present two-piece infrared single wavelength projection lens system, the radius of curvature of the image-side surface 111 of the first lens element 110 is R1, the radius of curvature of the image source-side surface 122 of the second lens element 120 is R4, and they satisfy the relation: R1/R4=−1.394.

In the first embodiment of the present two-piece infrared single wavelength projection lens system, a central thickness of the first lens element 110 along the optical axis 190 is CT1, a central thickness of the second lens element 120 along the optical axis 190 is CT2, and they satisfy the relation: CT1/CT2=0.578.

In the first embodiment of the present two-piece infrared single wavelength projection lens system, the focal length of the two-piece infrared single wavelength projection lens system is f, a distance from the image-side surface 111 of the first lens element 110 to the image plane 180 along the optical axis 190 is TL, and they satisfy the relation: f/TL=0.968.

In the first embodiment of the present two-piece infrared single wavelength projection lens system, a refractive index of the first lens element 110 is n1, a refractive index of the second lens element 120 is n2, and they satisfy the relations: n1=1.636 and n2=1.636.

The detailed optical data of the first embodiment is shown in table 1, and the aspheric surface data is shown in table 2.

TABLE 1

Embodiment 1
f(focal length) = 3.4 mm, Fno = 2.5, FOV = 14.8 deg.

| surface | | Curvature Radius | | Thickness | Material | Index | Abbe # | Focal length |
|---|---|---|---|---|---|---|---|---|
| 0 | object | infinity | | 500 | | | | |
| 1 | | infinity | | 0 | | | | |
| 2 | Lens 1 | 0.913 | (ASP) | 0.541 | plastic | 1.636 | 24 | 2.543 |
| 3 | | 1.716 | (ASP) | 0.141 | | | | |
| 4 | stop | infinity | | 1.140 | | | | |
| 5 | Lens 2 | −0.546 | (ASP) | 0.936 | plastic | 1.636 | 24 | 2.373 |
| 6 | | −0.655 | (ASP) | 0.753 | | | | |
| 7 | Image source plane | infinity | | — | | | | |

TABLE 2

Aspheric Coefficients

| surface | 2 | 3 | 5 | 6 |
|---|---|---|---|---|
| K: | −6.5186E−01 | 6.5613E+00 | −7.2972E−01 | −4.0166E−01 |
| A: | 7.4301E−02 | −6.1619E−02 | −1.7043E+00 | 1.1290E−02 |
| B: | 6.8259E−01 | 6.8336E−01 | 7.0489E+00 | 5.6384E−01 |
| C: | −3.6263E+00 | −6.1357E+00 | −2.4166E+02 | −3.7180E+00 |
| D: | 1.2485E+01 | 2.4993E+01 | 2.3632E+03 | 1.2776E+01 |
| E: | −2.0346E+01 | −4.8610E+01 | −1.2830E+04 | −2.1204E+01 |
| F: | 1.3909E+01 | 2.7431E+01 | 2.5095E+04 | 1.3946E+01 |

The units of the radius of curvature, the thickness and the focal length in table 1 are expressed in mm, the surface numbers 0-7 represent the surfaces sequentially arranged from the image-side to the image source-side along the optical axis. In table 2, k represents the conic coefficient of the equation of the aspheric surface profiles, and A, B, C, D, E, F . . . : represent the high-order aspheric coefficients. The tables presented below for each embodiment are the corresponding schematic parameter, aberration curves, and the definitions of the tables are the same as Table 1 and Table 2 of the first embodiment. Therefore, an explanation in this regard will not be provided again.

Figure 2A:
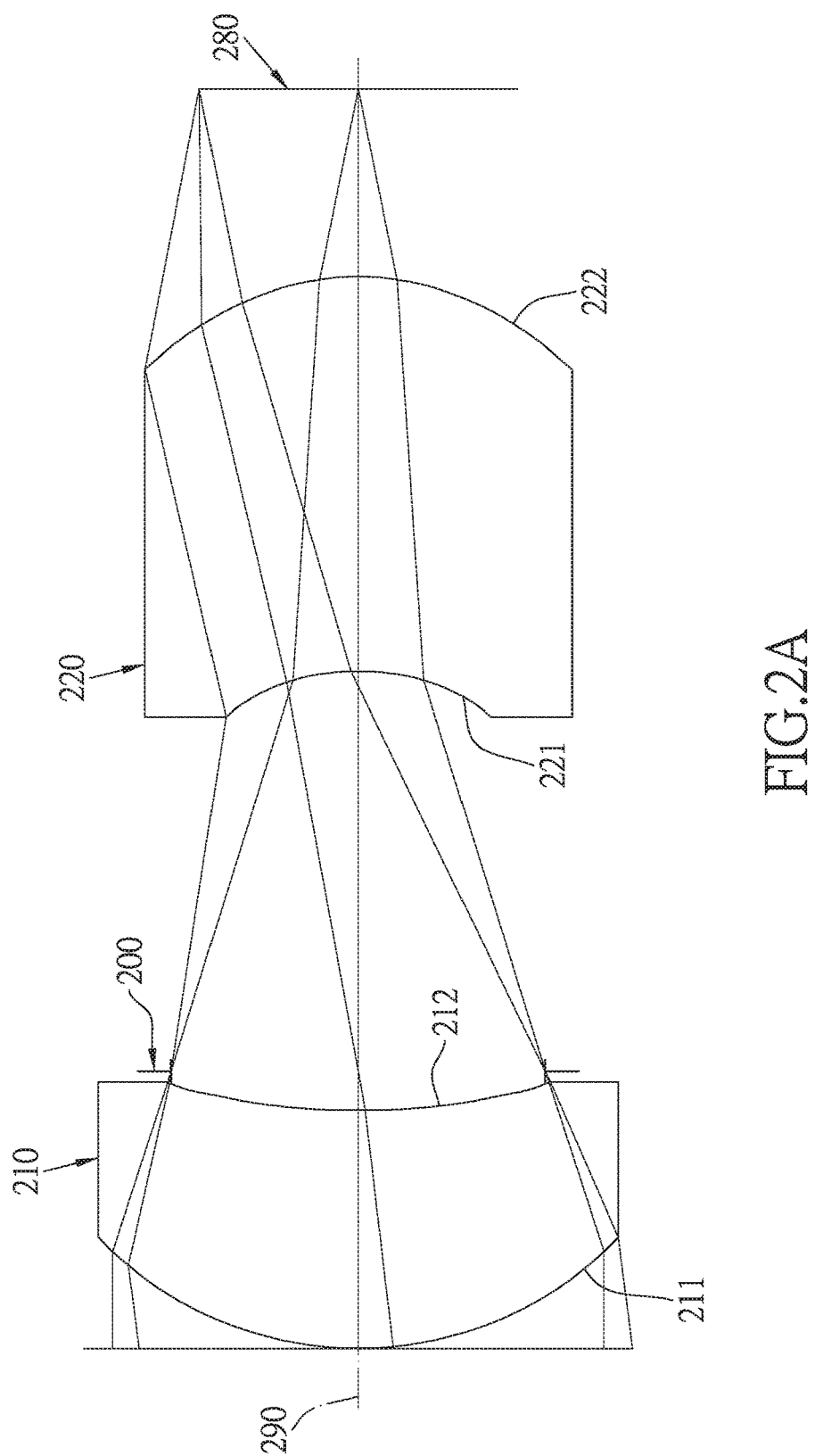
FIG. 2A shows a two-piece infrared single wavelength projection lens system in accordance with a second embodiment of the present invention.
Figure 2B:
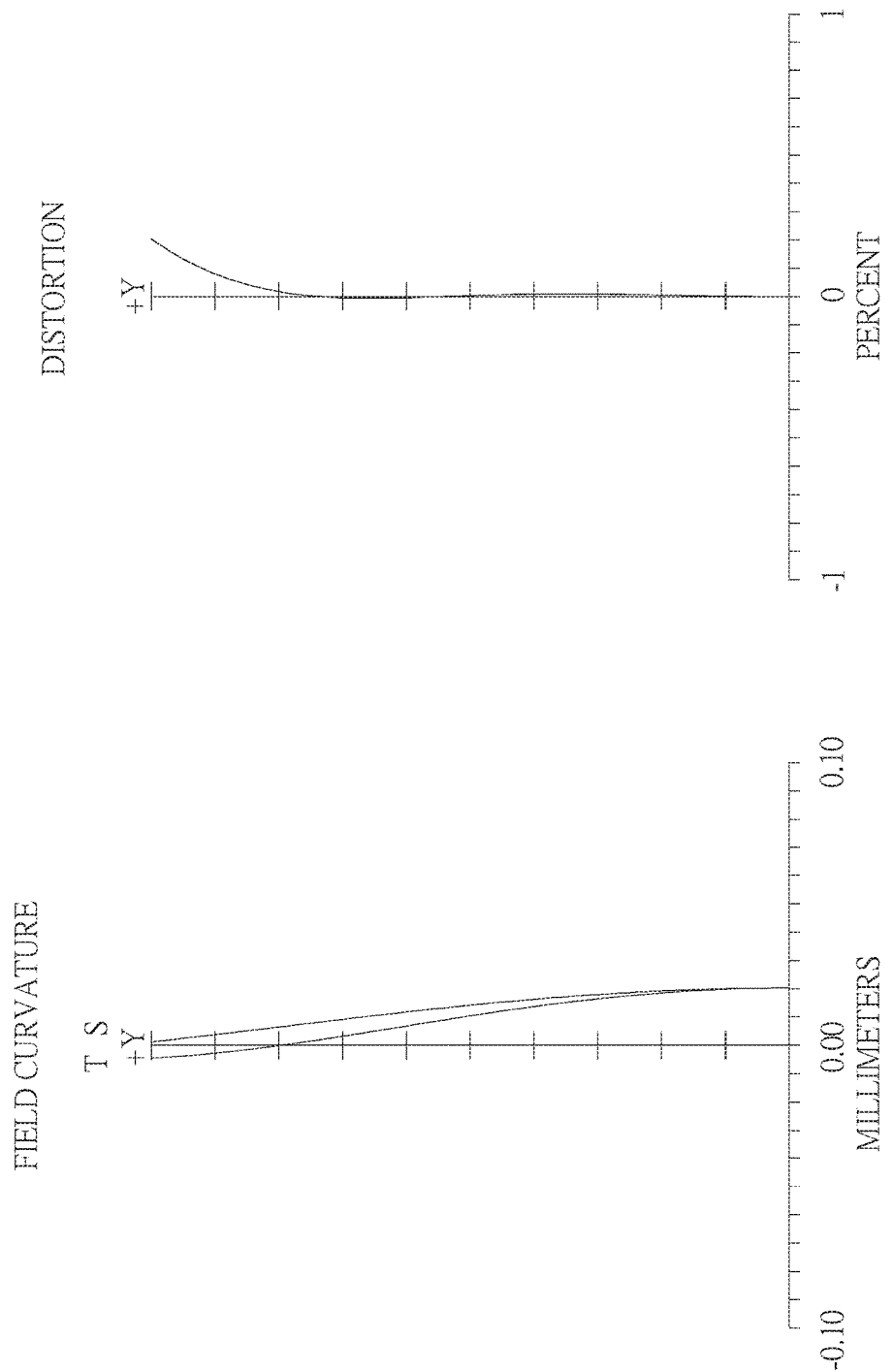
FIG. 2B shows the astigmatic field curve and the distortion curve of the second embodiment of the present invention.

Referring to FIGS. 2A and 2B, FIG. 2A shows a two-piece infrared single wavelength projection lens system in accordance with a second embodiment of the present invention, and FIG. 2B shows, in order from left to right, the astigmatic field curve and the distortion curve of the second embodiment of the present invention. A two-piece infrared single wavelength projection lens system in accordance with the second embodiment of the present invention comprises a stop 200 and a lens group. The lens group comprises, in order from an object side to an image side: a first lens element 210, a second lens element 220, and an image source plane 280, wherein the two-piece infrared single wavelength projection lens system has a total of two lens elements with refractive power. The stop 200 is disposed between an image source-side surface 212 of the first lens element 210 and an image-side surface 221 of the second lens element 220.

The first lens element 210 with a positive refractive power has an image-side surface 211 being convex near an optical axis 290 and the image source-side surface 212 being concave near the optical axis 290, the image-side surface 211 and the image source-side surface 212 are aspheric, and the first lens element 210 is made of plastic material.

The second lens element 220 with a positive refractive power has the image-side surface 221 being concave near the optical axis 290 and an image source-side surface 222 being convex near the optical axis 290, the image-side surface 221 and the image source-side surface 222 are aspheric, and the second lens element 220 is made of plastic material.

The detailed optical data of the second embodiment is shown in table 3, and the aspheric surface data is shown in table 4.

TABLE 4

Aspheric Coefficients

| surface | 2 | 3 | 5 | 6 |
|---|---|---|---|---|
| K: | −8.0206E−01 | 1.0268E+01 | −5.6615E−01 | −7.2445E−01 |
| A: | 1.0798E−01 | −3.6078E−02 | −8.8284E−01 | 3.7508E−02 |
| B: | −2.2946E−02 | −9.5929E−02 | −4.9527E+00 | −4.2950E−01 |
| C: | 3.1050E−01 | −8.2733E−02 | 3.3172E+01 | 1.3693E+00 |
| D: | −1.5676E−01 | 7.9209E−02 | −2.7957E+02 | −2.6424E+00 |
| E: | −4.0402E−01 | −7.5366E−01 | 8.9296E+02 | 2.0075E+00 |
| F: | 7.1086E−01 | −6.6697E+00 | −8.1780E+02 | −9.9271E−02 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | |
|---|---|
| f [mm] | 3.41 |
| Fno | 2.5 |
| FOV [deg.] | 14.7 |
| f1/f2 | 1.179 |
| f/f1 | 1.358 |
| f/f2 | 1.601 |
| f1/R1 | 2.513 |
| f1/R2 | 1.170 |
| f2/R3 | −3.083 |
| f2/R4 | −2.947 |
| R1/R2 | 0.465 |
| R3/R4 | 0.956 |
| R2/R4 | −0.337 |
| R2/R3 | −3.107 |
| R1/R4 | −1.383 |
| CT1/CT2 | 0.603 |
| f/TL | 0.976 |

Figure 3A:
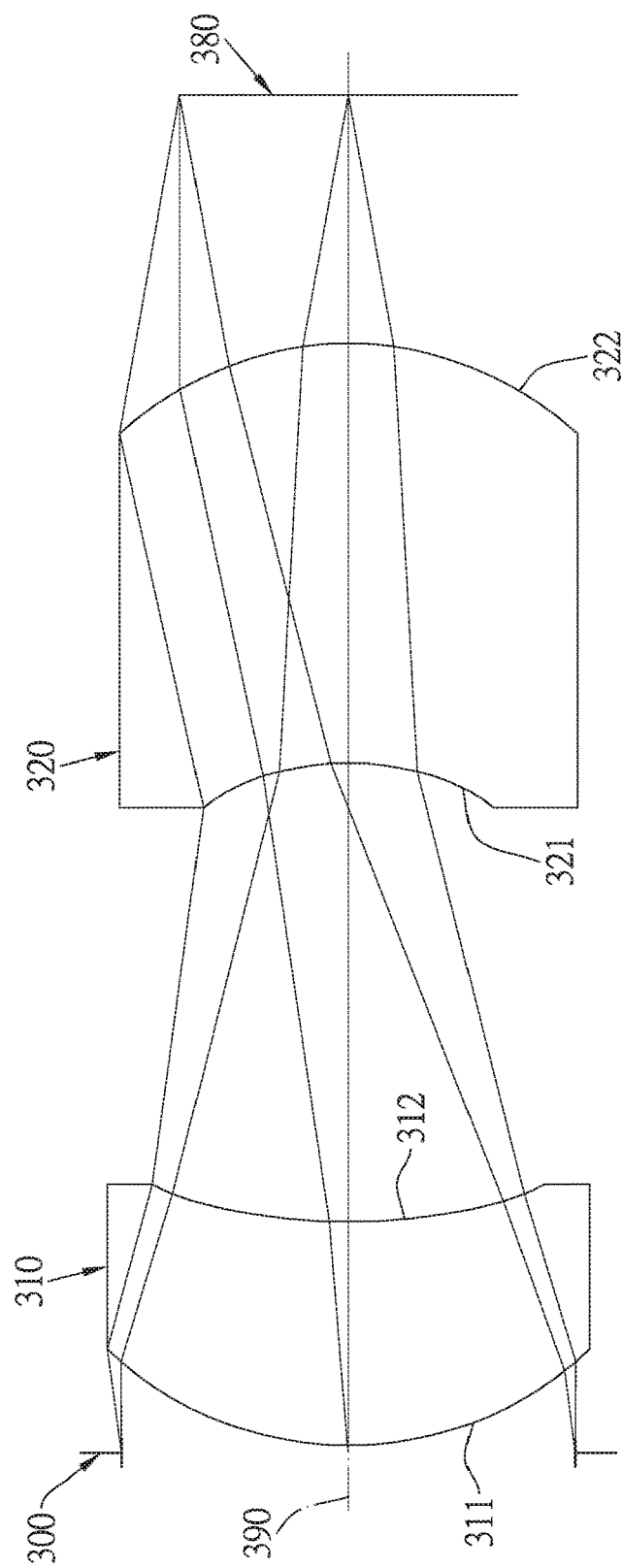
FIG. 3A shows a two-piece infrared single wavelength projection lens system in accordance with a third embodiment of the present invention.
Figure 3B:
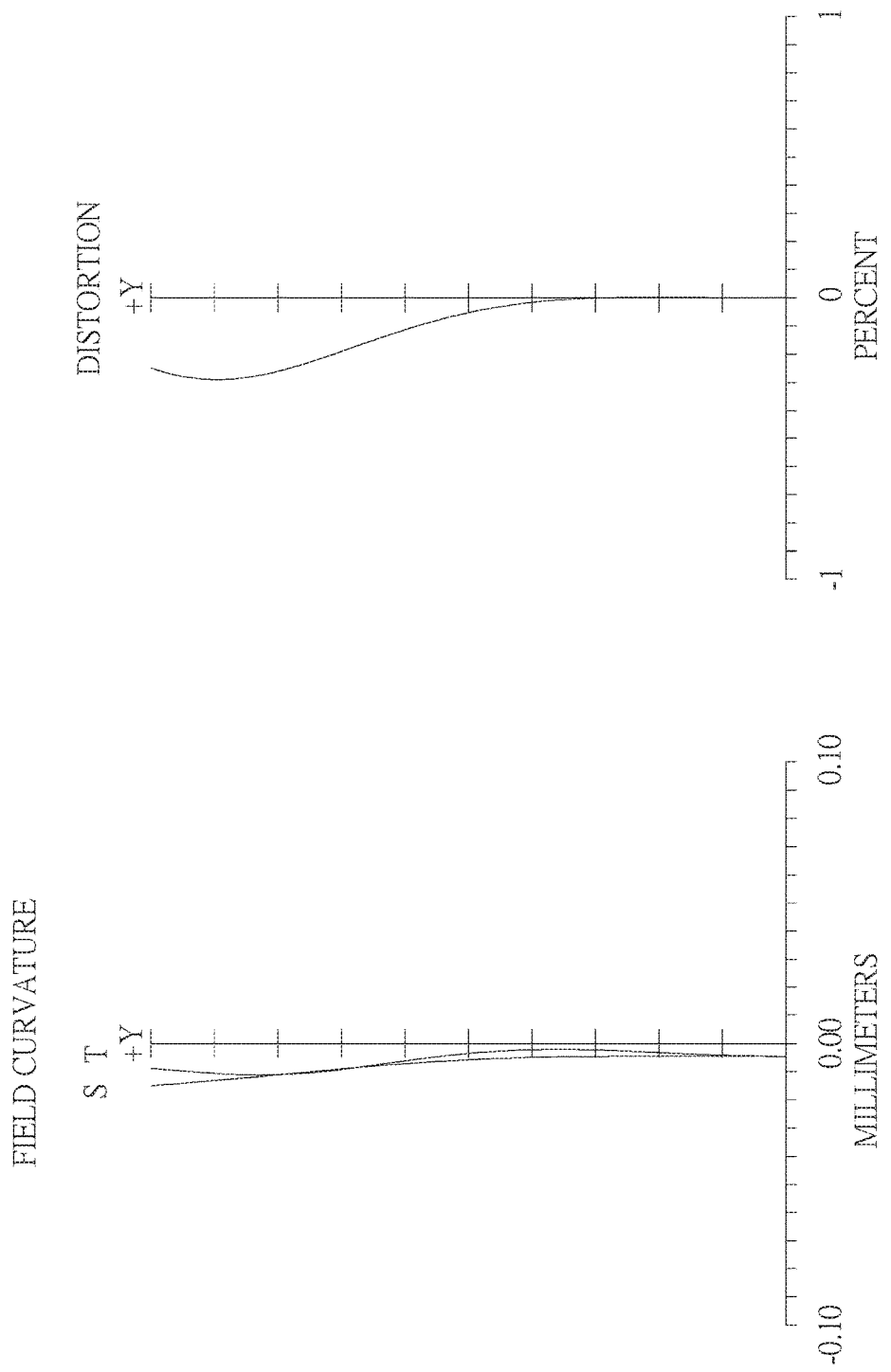
FIG. 3B shows the astigmatic field curve and the distortion curve of the third embodiment of the present invention.

Referring to FIGS. 3A and 3B, FIG. 3A shows a two-piece infrared single wavelength projection lens system in accordance with a third embodiment of the present invention, and FIG. 3B shows, in order from left to right, the astigmatic field curve and the distortion curve of the third embodiment of the present invention. A two-piece infrared single wavelength projection lens system in accordance with the third embodiment of the present invention comprises a stop 300

TABLE 3

Embodiment 2
f(focal length) = 3.41 mm, Fno = 2.5, FOV = 14.7 deg.

| surface | | Curvature Radius | | Thickness | Material | Index | Abbe # | Focal length |
|---|---|---|---|---|---|---|---|---|
| 0 | object | infinity | | 500 | | | | |
| 1 | | infinity | | 0 | | | | |
| 2 | Lens 1 | 0.998 | (ASP) | 0.660 | plastic | 1.636 | 24 | 2.507 |
| 3 | | 2.144 | (ASP) | 0.109 | | | | |
| 4 | stop | infinity | | 1.108 | | | | |
| 5 | Lens 2 | −0.690 | (ASP) | 1.094 | plastic | 1.636 | 24 | 2.127 |
| 6 | | −0.722 | (ASP) | 0.520 | | | | |
| 7 | Image source plane | infinity | | — | | | | | and a lens group. The lens group comprises, in order from an object side to an image side: a first lens element 310, a second lens element 320, and an image source plane 380, wherein the two-piece infrared single wavelength projection lens system has a total of two lens elements with refractive power. The stop 300 is disposed before an image source-side surface 312 of the first lens element 310.

The first lens element 310 with a positive refractive power has an image-side surface 311 being convex near an optical axis 390 and the image source-side surface 312 being concave near the optical axis 390, the image-side surface 311 and the image source-side surface 312 are aspheric, and the first lens element 310 is made of plastic material.

The second lens element 320 with a positive refractive power has an image-side surface 321 being concave near the optical axis 390 and an image source-side surface 322 being convex near the optical axis 390, the image-side surface 321 and the image source-side surface 322 are aspheric, and the second lens element 320 is made of plastic material.

The detailed optical data of the third embodiment is shown in table 5, and the aspheric surface data is shown in table 6.

TABLE 5

Embodiment 3
f(focal length) = 3.34 mm, Fno = 2.8, FOV = 15.0 deg.

| surface | | Curvature Radius | | Thickness | Material | Index | Abbe # | Focal length |
|---|---|---|---|---|---|---|---|---|
| 0 | object | infinity | | 400 | | | | |
| 1 | | infinity | | −0.020 | | | | |
| 2 | stop | infinity | | 0.020 | | | | |
| 3 | Lens 1 | 0.926 | (ASP) | 0.584 | plastic | 1.636 | 24 | 2.588 |
| 4 | | 1.701 | (ASP) | 1.200 | | | | |
| 5 | Lens 2 | −0.819 | (ASP) | 1.098 | plastic | 1.636 | 24 | 2.851 |
| 6 | | −0.840 | (ASP) | 0.650 | | | | |
| 7 | Image source plane | infinity | | — | | | | |

TABLE 6

Aspheric Coefficients

| surface | 3 | 4 | 5 | 6 |
|---|---|---|---|---|
| K: | −6.5438E−01 | 4.1653E+00 | −1.2968E+00 | 1.0929E−01 |
| A: | 6.1668E−02 | −2.1286E−02 | −1.1934E+00 | 6.5364E−02 |
| B: | 5.9039E−01 | 1.0800E+00 | 2.5743E+00 | 2.0855E−01 |
| C: | −2.4289E+00 | −6.3584E+00 | −7.3910E+00 | −1.1699E+00 |
| D: | 7.7639E+00 | 2.8667E+01 | 5.6014E+02 | 8.6673E+00 |
| E: | −1.1812E+01 | −6.2459E+01 | −1.7510E+03 | −2.1232E+01 |
| F: | 7.5943E+00 | 5.6756E+01 | 3.9483E+01 | 1.8670E+01 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

Embodiment 3

| f [mm] | 3.34 |
|---|---|
| Fno | 2.8 |
| FOV [deg.] | 15.0 |
| f1/f2 | 0.908 |
| f/f1 | 1.292 |
| f/f2 | 1.172 |
| f1/R1 | 2.794 |
| f1/R2 | 1.521 |
| f2/R3 | −3.481 |
| f2/R4 | −3.393 |
| R1/R2 | 0.544 |
| R3/R4 | 0.975 |
| R2/R4 | −0.494 |
| R2/R3 | −2.076 |
| R1/R4 | −1.102 |
| CT1/CT2 | 0.532 |
| f/TL | 0.941 |

Figure 4A:
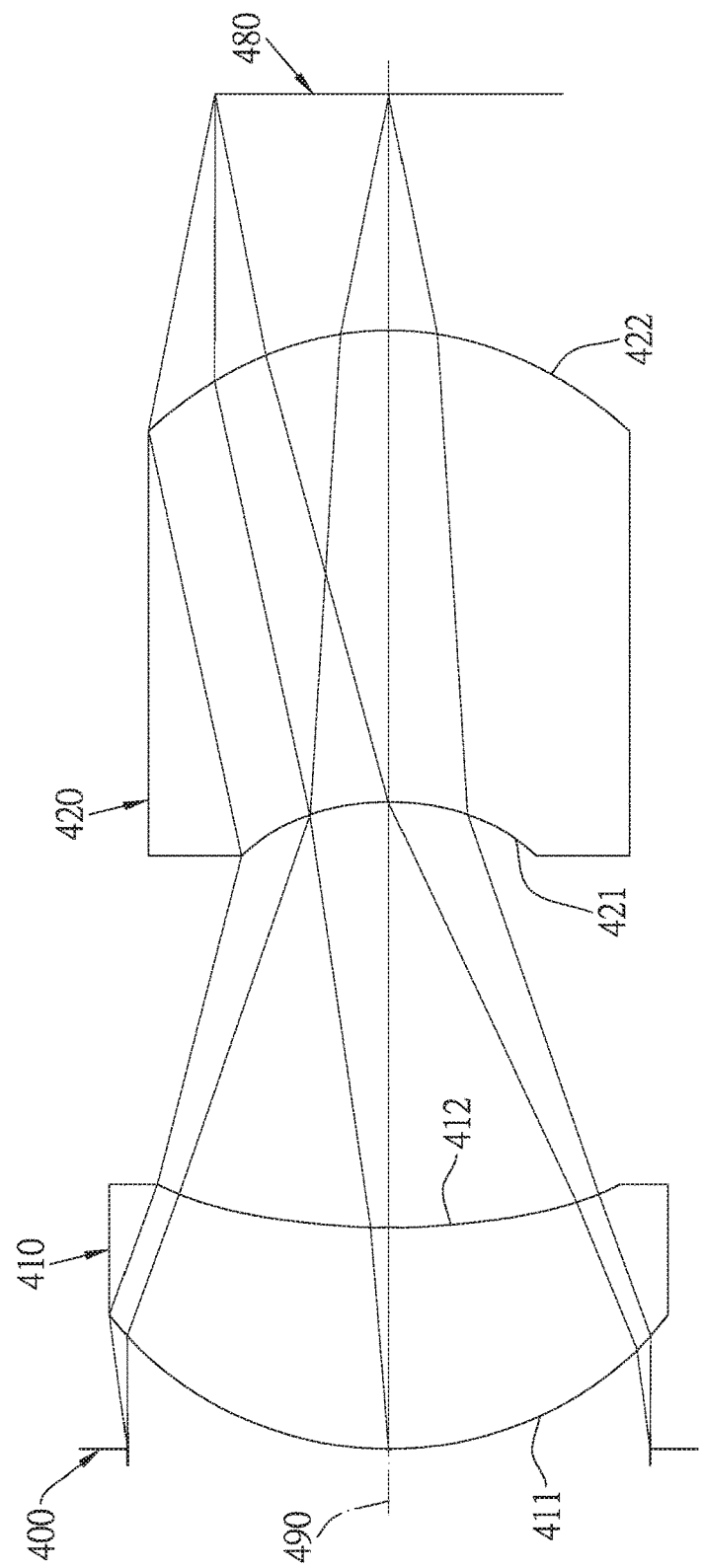
FIG. 4A shows a two-piece infrared single wavelength projection lens system in accordance with a fourth embodiment of the present invention.
Figure 4B:
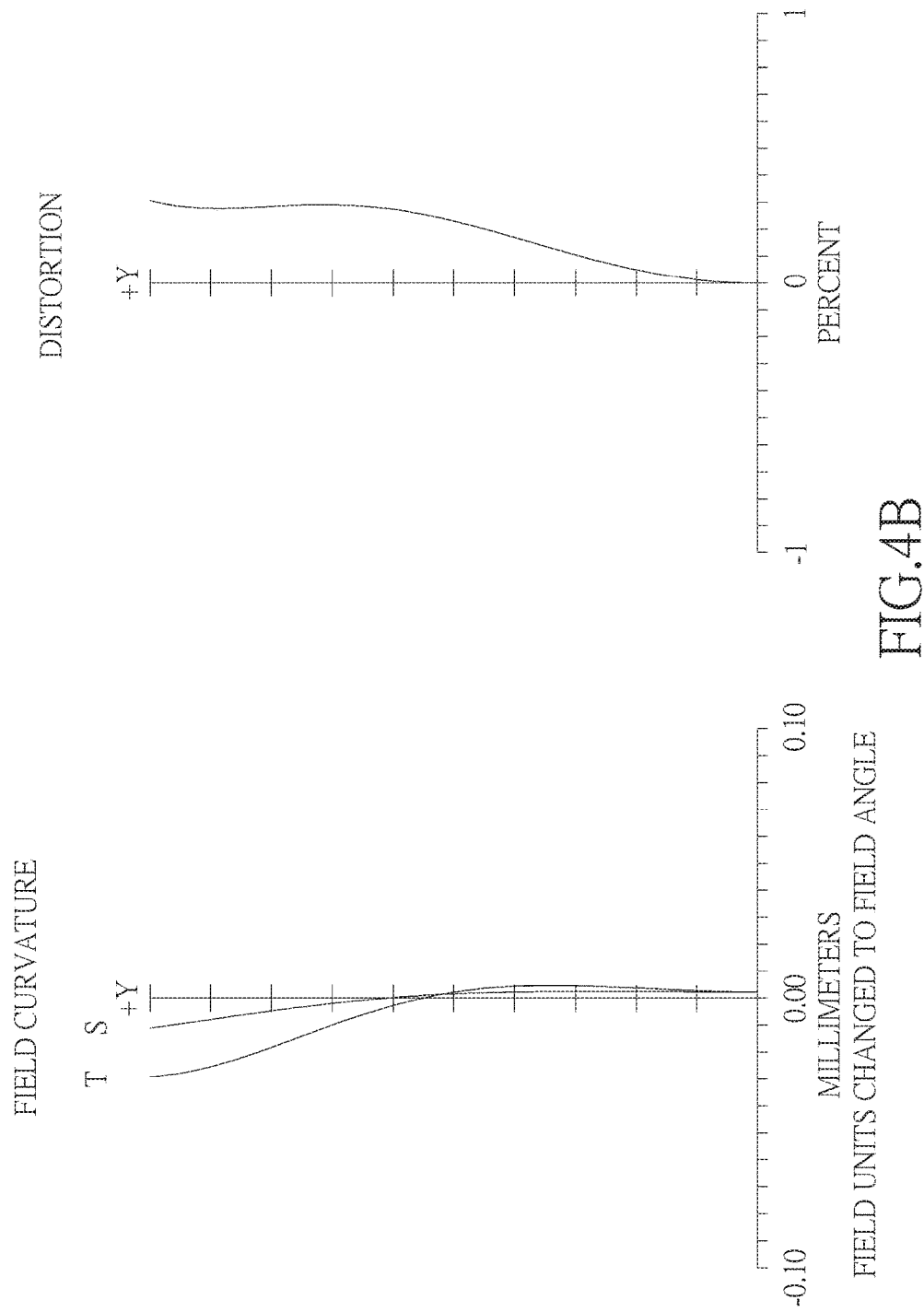
FIG. 4B shows the astigmatic field curve and the distortion curve of the fourth embodiment of the present invention.

Referring to FIGS. 4A and 4B, FIG. 4A shows a two-piece infrared single wavelength projection lens system in accordance with a fourth embodiment of the present invention, and FIG. 4B shows, in order from left to right, the astigmatic field curve and the distortion curve of the fourth embodiment of the present invention. A two-piece infrared single wavelength projection lens system in accordance with the fourth embodiment of the present invention comprises a stop 400 and a lens group. The lens group comprises, in order from an object side to an image side: a first lens element 410, a second lens element 420, and an image source plane 480, wherein the two-piece infrared single wavelength projection lens system has a total of two lens elements with refractive power. The stop 400 is disposed before an image source-side surface 412 of the first lens element 410.

The first lens element 410 with a positive refractive power has an image-side surface 411 being convex near an optical axis 490 and the image source-side surface 412 being concave near the optical axis 490, the image-side surface 411 and the image source-side surface 412 are aspheric, and the first lens element 410 is made of plastic material.

The second lens element 420 with a positive refractive power has an image-side surface 421 being concave near the optical axis 490 and an image source-side surface 422 being convex near the optical axis 490, the image-side surface 421 and the image source-side surface 422 are aspheric, and the second lens element 420 is made of plastic material.

The detailed optical data of the fourth embodiment is shown in table 7, and the aspheric surface data is shown in table 8.

TABLE 7

Embodiment 4
f(focal length) = 3.32 mm, Fno = 2.5, FOV = 15.1 deg.

| surface | | Curvature Radius | | Thickness | Material | Index | Abbe # | Focal length |
|---|---|---|---|---|---|---|---|---|
| 0 | object | infinity | | 350 | | | | |
| 1 | | infinity | | 0 | | | | |
| 2 | stop | infinity | | 0 | | | | |
| 3 | Lens 1 | 0.908 | (ASP) | 0.561 | plastic | 1.636 | 24 | 2.290 |
| 4 | | 1.979 | (ASP) | 1.079 | | | | |
| 5 | Lens 2 | −0.666 | (ASP) | 1.194 | plastic | 1.636 | 24 | 2.487 |
| 6 | | −0.778 | (ASP) | 0.597 | | | | |
| 7 | Image source plane | infinity | | — | | | | |

TABLE 8

Aspheric Coefficients

| surface | 3 | 4 | 5 | 6 |
|---|---|---|---|---|
| K: | −7.1315E−01 | 8.0198E+00 | −6.2421E−01 | −7.5226E−02 |
| A: | 5.8750E−02 | −1.3233E−01 | −1.2955E+00 | 1.6632E−01 |
| B: | 6.5049E−01 | 1.2051E+00 | 5.0430E+00 | 1.6926E−01 |
| C: | −3.0077E+00 | −7.9434E+00 | −1.0768E+02 | −1.2066E+00 |
| D: | 9.3928E+00 | 2.6400E+01 | 5.5955E+02 | 6.6949E+00 |
| E: | −1.4254E+01 | −4.4061E+01 | −7.7847E+02 | −1.2866E+01 |
| F: | 9.2385E+00 | 2.5239E+01 | −2.0247E+03 | 1.0428E+01 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | |
|---|---|
| f [mm] | 3.32 |
| Fno | 2.5 |
| FOV [deg.] | 15.1 |
| f1/f2 | 0.921 |
| f/f1 | 1.451 |
| f/f2 | 1.336 |
| f1/R1 | 2.523 |
| f1/R2 | 1.157 |
| f2/R3 | −3.734 |
| f2/R4 | −3.198 |
| R1/R2 | 0.459 |
| R3/R4 | 0.856 |
| R2/R4 | −0.393 |

-continued

| Embodiment 4 | |
|---|---|
| R2/R3 | −2.971 |
| R1/R4 | −1.167 |
| CT1/CT2 | 0.470 |
| f/TL | 0.968 |

Figure 5A:
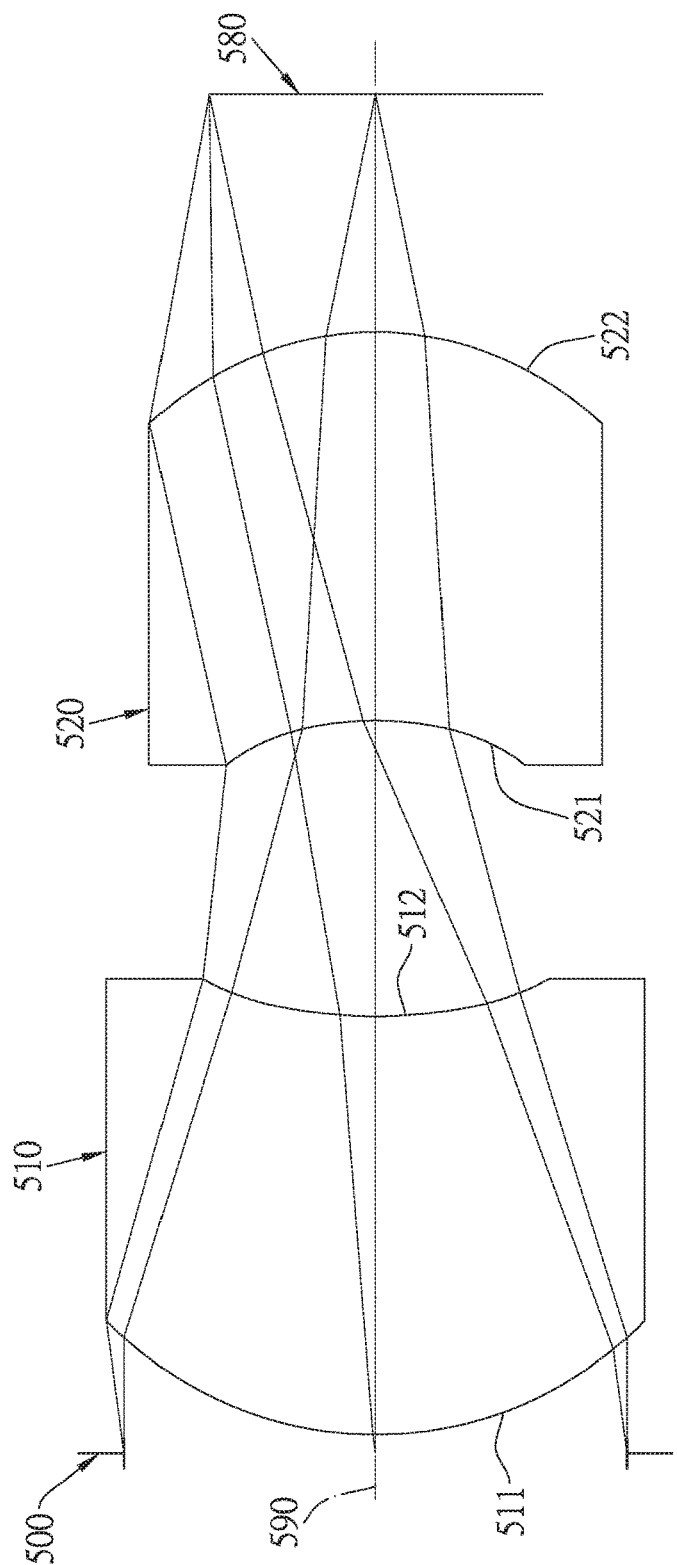
FIG. 5A shows a two-piece infrared single wavelength projection lens system in accordance with a fifth embodiment of the present invention.
Figure 5B:
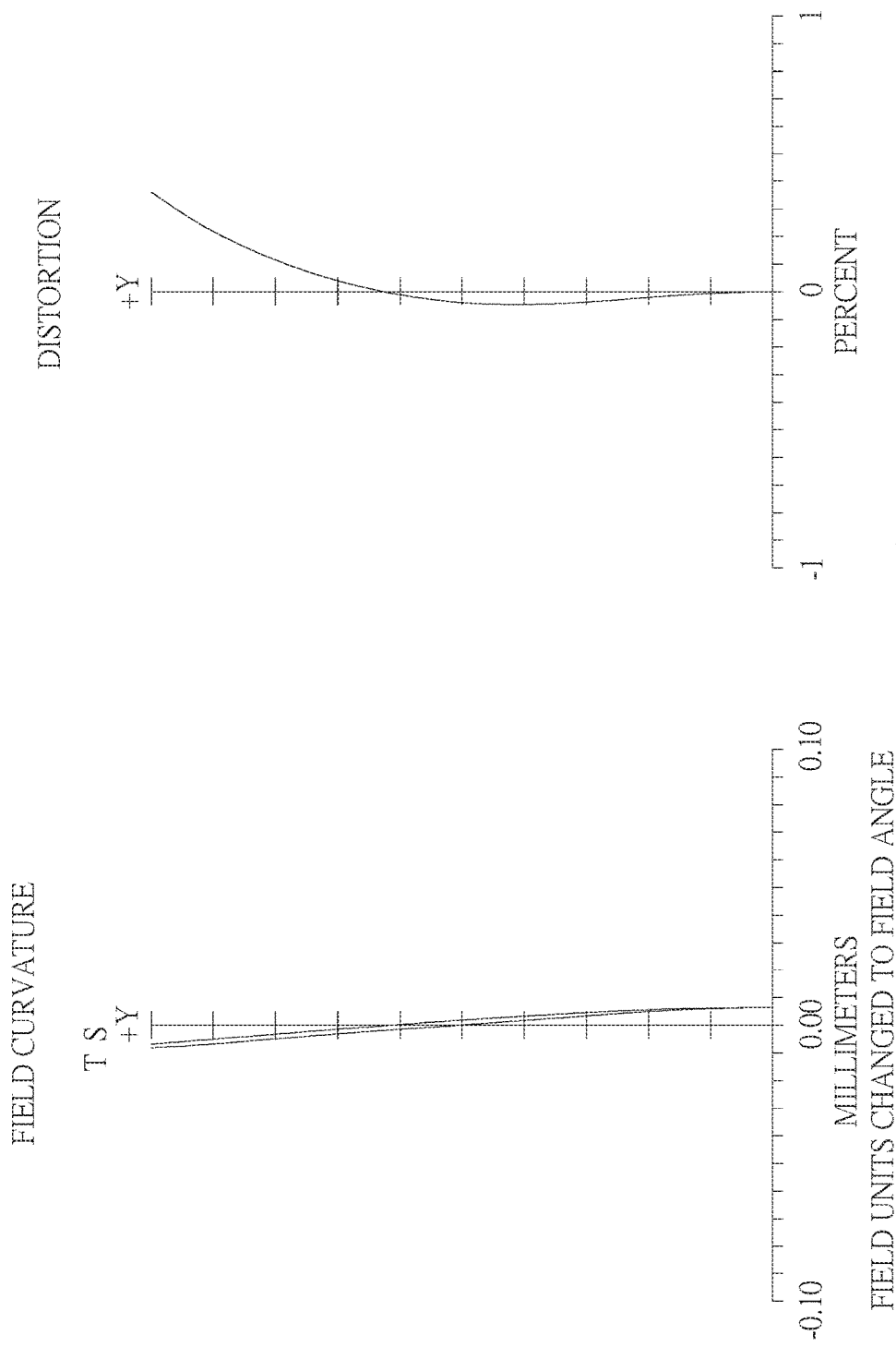
FIG. 5B shows the astigmatic field curve and the distortion curve of the fifth embodiment of the present invention.

Referring to FIGS. 5A and 5B, FIG. 5A shows a two-piece infrared single wavelength projection lens system in accordance with a fifth embodiment of the present invention, and FIG. 5B shows, in order from left to right, the astigmatic field curve and the distortion curve of the fifth embodiment of the present invention. A two-piece infrared single wavelength projection lens system in accordance with the fifth embodiment of the present invention comprises a stop 500 and a lens group. The lens group comprises, in order from an object side to an image side: a first lens element 510, a second lens element 520, and an image source plane 580, wherein the two-piece infrared single wavelength projection lens system has a total of two lens elements with refractive power. The stop 500 is disposed before an image source-side surface 512 of the first lens element 510.

The first lens element 510 with a positive refractive power has an image-side surface 511 being convex near an optical axis 590 and the image source-side surface 512 being concave near the optical axis 590, the image-side surface 511 and the image source-side surface 512 are aspheric, and the first lens element 510 is made of plastic material.

The second lens element 520 with a positive refractive power has an image-side surface 521 being concave near the optical axis 590 and an image source-side surface 522 being convex near the optical axis 590, the image-side surface 521 and the image source-side surface 522 are aspheric, and the second lens element 520 is made of plastic material.

The detailed optical data of the fifth embodiment is shown in table 9, and the aspheric surface data is shown in table 10.

TABLE 9

Embodiment 5
f(focal length) = 3.33 mm, Fno = 2.5, FOV = 15.0 deg.

| surface | | Curvature Radius | | Thickness | Material | Index | Abbe # | Focal length |
|---|---|---|---|---|---|---|---|---|
| 0 | object | infinity | | 350 | | | | |
| 1 | | infinity | | −0.05 | | | | |
| 2 | stop | infinity | | 0.05 | | | | |
| 3 | Lens 1 | 0.979 | (ASP) | 1.107 | plastic | 1.636 | 24 | 2.749 |
| 4 | | 1.343 | (ASP) | 0.783 | | | | |

TABLE 9-continued

Embodiment 5
f(focal length) = 3.33 mm, Fno = 2.5, FOV = 15.0 deg.

| surface | | Curvature Radius | | Thickness | Material | Index | Abbe # | Focal length |
|---|---|---|---|---|---|---|---|---|
| 5 | Lens 2 | −0.876 | (ASP) | 1.030 | plastic | 1.636 | 24 | 2.572 |
| 6 | | −0.813 | (ASP) | 0.630 | | | | |
| 7 | Image source plane | infinity | | — | | | | |

TABLE 10

Aspheric Coefficients

| surface | 3 | 4 | 5 | 6 |
|---|---|---|---|---|
| K: | −8.2939E−01 | 9.6178E−01 | −5.9790E−01 | −3.5047E−02 |
| A: | 9.7377E−02 | 1.6402E−01 | −7.5849E−01 | 6.6227E−02 |
| B: | 6.4112E−02 | 1.6662E+00 | −2.1847E+00 | 3.1175E−01 |
| C: | −8.8674E−03 | −1.5508E+01 | 8.4820E+00 | −1.3015E+00 |
| D: | 2.0174E−01 | 1.1628E+02 | −8.2079E+01 | 5.0866E+00 |
| E: | −3.1401E−01 | −4.0982E+02 | 2.6670E+02 | −8.8577E+00 |
| F: | 2.6378E−01 | 6.3048E+02 | −4.8349E+02 | 6.9202E+00 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | |
|---|---|
| f [mm] | 3.33 |
| Fno | 2.5 |
| FOV [deg.] | 15.0 |
| f1/f2 | 1.069 |
| f/f1 | 1.211 |
| f/f2 | 1.294 |
| f1/R1 | 2.807 |
| f1/R2 | 2.047 |
| f2/R3 | −2.936 |
| f2/R4 | −3.162 |
| R1/R2 | 0.729 |
| R3/R4 | 1.077 |
| R2/R4 | −0.606 |
| R2/R3 | −1.533 |
| R1/R4 | −1.204 |
| CT1/CT2 | 1.075 |
| f/TL | 0.925 |

Figure 6A:
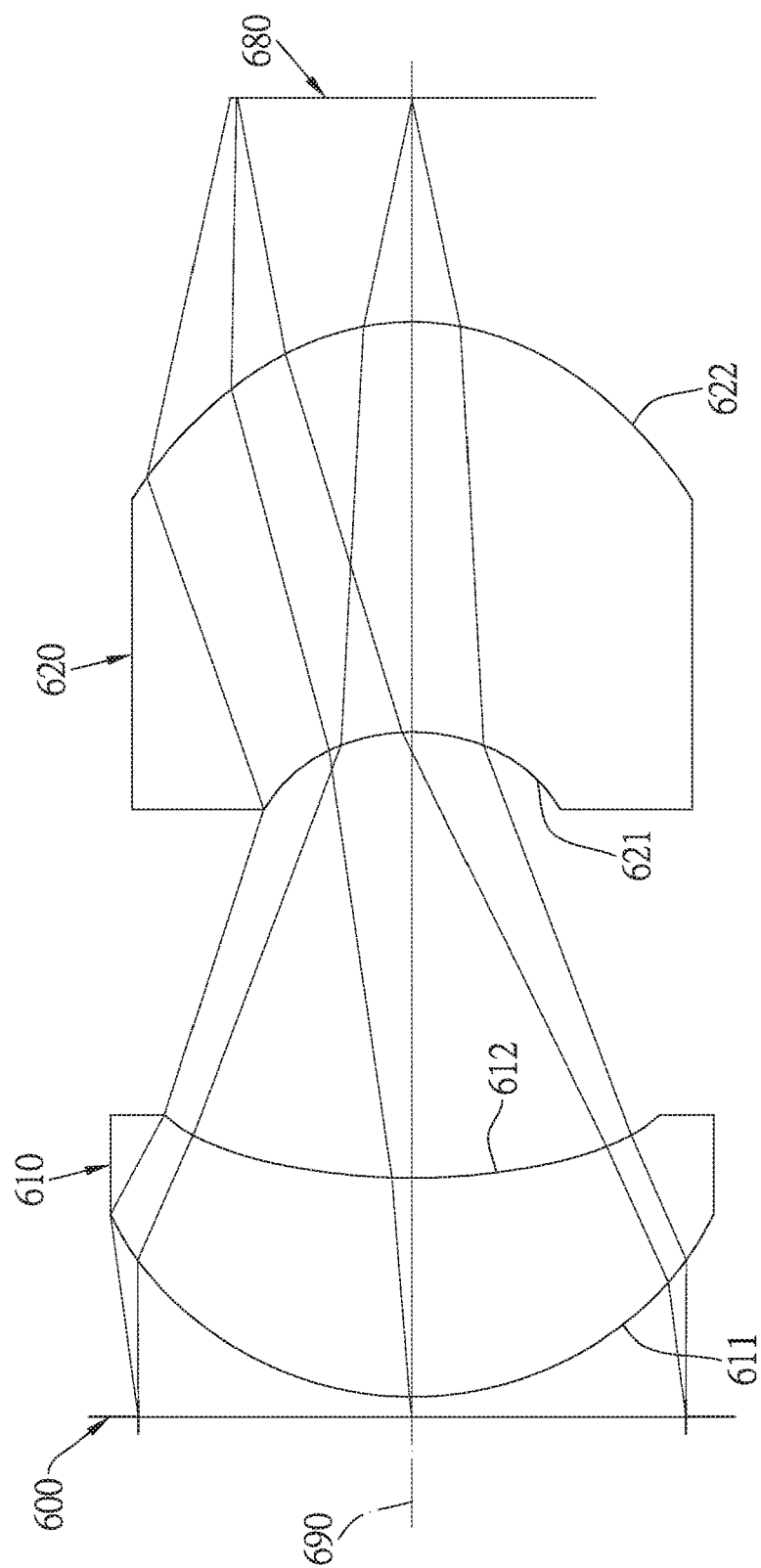
FIG. 6A shows a two-piece infrared single wavelength projection lens system in accordance with a sixth embodiment of the present invention.

Referring to FIGS. 6A and 6B, FIG. 6A shows a two-piece infrared single wavelength projection lens system in accordance with a sixth embodiment of the present invention, and FIG. 6B shows, in order from left to right, the astigmatic field curve and the distortion curve of the sixth embodiment of the present invention. A two-piece infrared single wavelength projection lens system in accordance with the sixth embodiment of the present invention comprises a stop 600 and a lens group. The lens group comprises, in order from an object side to an image side: a first lens element 610, a second lens element 620, and an image source plane 680, wherein the two-piece infrared single wavelength projection lens system has a total of two lens elements with refractive power. The stop 600 is disposed before an image source-side surface 612 of the first lens element 610.

The first lens element 610 with a positive refractive power has an image-side surface 611 being convex near an optical axis 690 and the image source-side surface 612 being concave near the optical axis 690, the image-side surface 611 and the image source-side surface 612 are aspheric, and the first lens element 610 is made of plastic material.

The second lens element 620 with a positive refractive power has an image-side surface 621 being concave near the optical axis 690 and an image source-side surface 622 being convex near the optical axis 690, the image-side surface 621 and the image source-side surface 622 are aspheric, and the second lens element 620 is made of plastic material.

The detailed optical data of the sixth embodiment is shown in table 11, and the aspheric surface data is shown in table 12.

TABLE 11

Embodiment 6
f(focal length) = 3.30 mm, Fno = 2.4, FOV = 15.3 deg.

| surface | | Curvature Radius | | Thickness | Material | Index | Abbe # | Focal length |
|---|---|---|---|---|---|---|---|---|
| 0 | object | infinity | | 340 | | | | |
| 1 | | infinity | | −0.05 | | | | |
| 2 | stop | infinity | | 0.05 | | | | |
| 3 | Lens 1 | 0.86 | (ASP) | 0.55 | plastic | 1.636 | 24 | 2.211 |
| 4 | | 1.79 | (ASP) | 1.11 | | | | |
| 5 | Lens 2 | −0.51 | (ASP) | 1.03 | plastic | 1.636 | 24 | 1.935 |
| 6 | | −0.63 | (ASP) | 0.56 | | | | |

TABLE 11-continued

Embodiment 6
f(focal length) = 3.30 mm, Fno = 2.4, FOV = 15.3 deg.

| surface | | Curvature Radius | Thickness | Material Index | Abbe # | Focal length |
|---|---|---|---|---|---|---|
| 7 | Image source plane | infinity | — | | | |

TABLE 12

Aspheric Coefficients

| surface | 3 | 4 | 5 | 6 |
|---|---|---|---|---|
| K: | −1.2107E+00 | 8.8834E−01 | 1.1966E−01 | −6.0821E−01 |
| A: | 1.9454E−01 | 1.2563E−01 | 4.7092E−01 | 4.2120E−01 |
| B: | 6.0335E−01 | 8.9542E−02 | −5.9872E+01 | −3.8951E+00 |
| C: | −3.1879E+00 | −1.0412E+00 | 1.0862E+03 | 1.8267E+01 |
| D: | 1.1561E+01 | 1.2755E+01 | −1.0821E+04 | −4.5358E+01 |
| E: | −1.9505E+01 | −4.1414E+01 | 5.2250E+04 | 5.6576E+01 |
| F: | 1.4016E+01 | 5.6730E+01 | −9.6260E+04 | −2.7780E+01 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | |
|---|---|
| f [mm] | 3.30 |
| Fno | 2.4 |
| FOV [deg.] | 15.3 |
| f1/f2 | 1.143 |
| f/f1 | 1.492 |
| f/f2 | 1.705 |
| f1/R1 | 2.574 |
| f1/R2 | 1.236 |
| f2/R3 | −3.797 |
| f2/R4 | −3.080 |
| R1/R2 | 0.480 |
| R3/R4 | 0.811 |
| R2/R4 | −2.846 |
| R2/R3 | −3.508 |
| R1/R4 | −1.367 |
| CT1/CT2 | 0.534 |
| f/TL | 1.000 |

In the present two-piece infrared single wavelength projection lens system, the lens elements can be made of plastic or glass. If the lens elements are made of plastic, the cost will be effectively reduced. If the lens elements are made of glass, there is more freedom in distributing the refractive power of the two-piece infrared single wavelength projection lens system. Plastic lens elements can have aspheric surfaces, which allow more design parameter freedom (than spherical surfaces), so as to reduce the aberration and the number of the lens elements, as well as the total track length of the two-piece infrared single wavelength projection lens system.

In the present two-piece infrared single wavelength projection lens system, if the image-side or the image source-side surface of the lens elements with refractive power is convex and the location of the convex surface is not defined, the image-side or the image source-side surface of the lens elements near the optical axis is convex. If the image-side or the image source-side surface of the lens elements is concave and the location of the concave surface is not defined, the image-side or the image source-side surface of the lens elements near the optical axis is concave.

While we have shown and described various embodiments in accordance with the present invention, it should be clear to those skilled in the art that further embodiments may be made without departing from the scope of the present invention.

What is claimed is:

1. A two-piece infrared single wavelength projection lens system, in order from an image side to an image source side, comprising:
   a first lens element with a positive refractive power, having an image-side surface being convex near an optical axis and an image source-side surface being concave near the optical axis, at least one of the image-side surface and the image source-side surface of the first lens element being aspheric;
   a second lens element with a positive refractive power, having an image-side surface being concave near the optical axis and an image source-side surface being convex near the optical axis, at least one of the image-side surface and the image source-side surface of the second lens element being aspheric; and
   a stop disposed before the image source-side surface of the first lens element or between the image source-side surface of the first lens element and the image-side surface of the second lens element;
   wherein a focal length of the two-piece infrared single wavelength projection lens system is f, a focal length of the first lens element is f1, and they satisfy the relation: $1.0 < f/f1 < 1.7$.

2. The two-piece infrared single wavelength projection lens system as claimed in claim 1, wherein the focal length of the first lens element is f1, a focal length of the second lens element is f2, and they satisfy the relation: $0.7 < f1/f2 < 1.4$.

3. The two-piece infrared single wavelength projection lens system as claimed in claim 1, wherein the focal length of the two-piece infrared single wavelength projection lens system is f, a focal length of the second lens element is f2, and they satisfy the relation: $0.9 < f/f2 < 1.7$.

4. The two-piece infrared single wavelength projection lens system as claimed in claim 1, wherein the focal length of the first lens element is f1, a radius of curvature of the image-side surface of the first lens element is R1, and they satisfy the relation: $2.2 < f1/R1 < 3.0$.

5. The two-piece infrared single wavelength projection lens system as claimed in claim 1, wherein the focal length of the first lens element is f1, a radius of curvature of the image source-side surface of the first lens element is R2, and they satisfy the relation: $0.85<f1/R2<2.35$.

6. The two-piece infrared single wavelength projection lens system as claimed in claim 1, wherein a focal length of the second lens element is f2, a radius of curvature of the image-side surface of the second lens element is R3, and they satisfy the relation: $-4.7<f2/R3<-2.5$.

7. The two-piece infrared single wavelength projection lens system as claimed in claim 1, wherein a focal length of the second lens element is f2, a radius of curvature of the image source-side surface of the second lens element is R4, and they satisfy the relation: $-3.9<f2/R4<-2.6$.

8. The two-piece infrared single wavelength projection lens system as claimed in claim 1, wherein a radius of curvature of the image-side surface of the first lens element is R1, a radius of curvature of the image source-side surface of the first lens element is R2, and they satisfy the relation: $0.25<R1/R2<0.95$.

9. The two-piece infrared single wavelength projection lens system as claimed in claim 1, wherein a radius of curvature of the image-side surface of the second lens element is R3, a radius of curvature of the image source-side surface of the second lens element is R4, and they satisfy the relation: $0.6<R3/R4<1.3$.

10. The two-piece infrared single wavelength projection lens system as claimed in claim 1, wherein a radius of curvature of the image source-side surface of the first lens element is R2, a radius of curvature of the image source-side surface of the second lens element is R4, and they satisfy the relation: $-0.81<R2/R4<-0.13$.

11. The two-piece infrared single wavelength projection lens system as claimed in claim 1, wherein a radius of curvature of the image source-side surface of the first lens element is R2, a radius of curvature of the image-side surface of the second lens element is R3, and they satisfy the relation: $-3.4<R2/R3<-1.2$.

12. The two-piece infrared single wavelength projection lens system as claimed in claim 1, wherein a radius of curvature of the image-side surface of the first lens element is R1, a radius of curvature of the image source-side surface of the second lens element is R4, and they satisfy the relation: $-1.7<R1/R4<-0.8$.

13. The two-piece infrared single wavelength projection lens system as claimed in claim 1, wherein a central thickness of the first lens element along the optical axis is CT1, a central thickness of the second lens element along the optical axis is CT2, and they satisfy the relation: $0.2<CT1/CT2<1.3$.

14. The two-piece infrared single wavelength projection lens system as claimed in claim 1, wherein the focal length of the two-piece infrared single wavelength projection lens system is f, a distance from the image-side surface of the first lens element to an image plane along the optical axis is TL, and they satisfy the relation: $0.7<f/TL<1.2$.

15. The two-piece infrared single wavelength projection lens system as claimed in claim 1, wherein a refractive index of the first lens element is n1, a refractive index of the second lens element is n2, and they satisfy the relations: $n1>1.6$ and $n2>1.6$.

* * * * *